Patented Sept. 16, 1930

1,775,867

UNITED STATES PATENT OFFICE

ERNST G. SANDMEIER, OF LOCARNO, SWITZERLAND, ASSIGNOR TO SWISS JEWEL CO. S. A., OF LOCARNO, SWITZERLAND

SYNTHETIC ORIENTAL EMERALD OR EMERALD-GREEN SAPPHIRE

No Drawing. Application filed February 28, 1928, Serial No. 257,794, and in Switzerland January 19, 1928.

The present invention relates to synthetic oriental emeralds or emerald-green sapphires which are substantially identical in their chemical and physical properties with, and quite equivalent in colour and transparency to, the natural oriental emeralds.

Various artificial gems have been manufactured heretofore synthetically, such as rubies and blue and bottle-green sapphires, but an emerald-green sapphire almost indistinguishable from the natural oriental emerald has not yet been manufactured.

The apparatus and the process of manufacturing the gem according to the present invention is very like that known as the Verneuil apparatus and process and comprises essentially a blow pipe producing an oxy-hydrogen flame (see Patents Nos. 988,230 and 1,004,505, granted to A. V. L. Verneuil March 28 and Sept. 26, 1911, respectively.

The constituent materials which are subjected to said process are powdered aluminium oxide, cobalt oxide, vanadium oxide and nickel salt. These elements are mixed and caused to fall through a flame on a support of fire clay where they are fused and form the artificial stone by successive cap-shaped layers such as has been set forth in Patent 1,004,505 mentioned above.

The proportions of the powdered ingredients are substantially 98,6% aluminium oxide, 0,986% cobalt oxide, 0,119% vanadium oxide and 0,295% nickel salt. Other compounds of these metals could also be used owing to the fact that such compounds, at the temperature of the flame kept up during the forming of the stone, will be reduced to the first named compounds. But care must be taken to maintain the true proportions by calculating the proportions according to the chemical values of the compounds employed.

The physical properties of the synthetic oriental emerald according to the present invention are, with the exception of its beautiful green colour and its transparency, the same as those stated in the case of the synthetic sapphires obtained according to the later Verneuil patent, to wit:

The synthetic stones produced by the above method and apparatus have a hardness of 9, diamond being 10, and may be distinguished on the market from the natural stones by observing the following differences in their physical characteristics:— Cracks or scratches are often seen in the natural stones under a high-power microscope, but they seem to be on the surface and resemble the parallel scratches made by a file on the edge of a glass plate. They are probably due to the cutting operation. In the synthetic stone, on the other hand, the cracks, when they occur, appear as genuine rifts beneath the surface, and are generally curved, due probably to the curved layers out of which the stone is formed. The layers comprising the natural stone are flat and parallel, while those of the synthetic stone are curved, as above stated. The specks or cavity-like spots appearing in the natural stone are bounded by angular or crystal-shaped walls, while those occurring in the synthetic stone have curved or bubble-like walls. The above characteristics in nearly all cases must be looked for with a high-power microscope. When cut, however, the transparency and other optical properties of the natural and synthetic stones may be considered identical.

What I claim as new is:

1. A composition of matter adapted to produce oriental emerald sapphires and containing aluminium, cobalt, vanadium and nickel in such proportions that when heated to a suitable temperature there will be produced a mass containing substantially 98,6% aluminium oxid, 0,986% cobalt oxid, 0,119% vanadium oxid and 0,295% nickel oxid.

2. A synthetic crystalline corundum product having an emerald-green colour, containing 100 grammes aluminium oxid, 1 gramme cobalt oxid, 0.12 gramme vanadium oxid, and 0.3 nickel salt.

In testimony whereof I affix my signature.

ERNST G. SANDMEIER.